United States Patent
Oppolzer

[15] 3,679,699
[45] July 25, 1972

[54] CIS-2-ACETYL-1-METHYL-1,2,3,3A,4,9B-HEXAHYDRO[1]BENZOPYRANO [4,3-C]PYRAZOLE

[72] Inventor: Wolfgang Oppolzer, Riehen, Switzerland

[73] Assignee: Sandoz Ltd. (a.k.a. Sandoz AG), Basel, Switzerland

[22] Filed: Dec. 11, 1969

[21] Appl. No.: 884,313

[30] Foreign Application Priority Data

May 22, 1968 Switzerland ..........................7659/68
Dec. 12, 1968 Switzerland ........................18517/68
March 25, 1969 Switzerland ..........................4471/69

[52] U.S. Cl.....................260/310 D, 260/279 R, 260/287 R, 260/293.6, 260/310 A, 424/273
[51] Int. Cl. .......................................................C07d 49/18
[58] Field of Search ...............................................260/310 D Primary Examiner—Alex Mazel
Assistant Examiner—Jose Tovar
Attorney—Gerald D. Sharkin, Robert S. Honor, Frederick H. Weinfeldt, Richard E. Vila and Walter F. Jewell

[57] ABSTRACT

The invention concerns a process for the production of an anellated or bridged N'-monosubstituted N-acyl pyrazolidine, characterized in that an olefinic aldehyde component comprising an olefinic aldehyde, or one of its reactive functional derivatives having its olefinic C/C double bond separated from the aldehyde by three to five atoms, of which one or two members may be contained in the same ring, and a hydrazine component comprising an N'-monosubstituted N-acl hydrazine, are reacted together with the removal of water.

The invention furthermore extends to various compounds which may be produced by the process. The invention allows for production of a large class of novel pharmacologically active compounds.

1 Claim, No Drawings

CIS-2-ACETYL-1-METHYL-1,2,3,3A,4,9B-HEXAHYDRO [1]BENZOPYRANO [4,3-C]PYRAZOLE

The present invention relates to a process for the production of new anellated or bridged N'-monosubstituted N-acyl pyrazolidines, characterized in that an olefinic aldehyde component comprising an olefinic aldehyde, or one of its reactive functional derivatives having its olefinic C/C double bond separated from the aldehyde by three to five atoms, of which one or two members may be contained in the same ring, and a hydrazine component comprising an N'-monosubstituted N-acyl hydrazine, are reacted together with the removal of water. The anellated or bridged N'-monosubstituted N-acyl pyrazolidines which may be produced in accordance with the process of the invention are also included in the scope of the present invention.

N'-Methyl-N-phenyl-acetyl hydrazine, N-acetyl-N'-methyl-hydrazine or cyclic compounds such as 3-pyrazolidone may, for example, be used as the hydrazine component; o-allyloxy benzaldehyde, trans-1-chloro-4-(o-formyl-phenoxy)-2-butene, N-allyl-N-formyl-o-aminobenzaldehyde, o-allyl-benzaldehyde or -phenylacetaldehyde, o-allyloxy-phenyl acetaldehyde, citronellal, 1-formylmethyl- or 1-(2-formylethyl)-1,2-dihydroquinoline, o-2cyclohexenyloxy-benzaldehyde or N-2-cyclohexenyl-N-formyl-o-aminobenzaldehyde may, for example, be used as olefinic aldehyde component.

The process may, for example, be effected as follows:

The two components are taken up in an organic solvent which is inert under the reaction conditions and which allows for the removal of the water formed during the reaction by azeotropic distillation, e.g. benzene, toluene, dioxane, dimethyl formamide. The mixture is then heated to the boil under reflux for about 2 to 20 hours (conveniently at a slightly reduced pressure, e.g. at about 80–120 mm of Hg), whereby the condensed product flowing back from the cooler is passed through a water separator or over a solid drying agent, especially a so-called molecular sieve or over magnesium sulphate or calcium sulphate etc. (e.g. in a Soxhlet apparatus). However, it is also possible to add the drying agent to the reaction mixture.

After the reaction is completed the anellated or bridged N'-substituted N-acyl pyrazolidines produced in accordance with the invention may be isolated in the usual manner, e.g. by concentrating the reaction mixture by evaporation, and may be purified in manner known per se, e.g. by chromatography, crystallization or distillation.

The process of the invention has hitherto not been described in the literature. It permits the synthesis of an extended class of structurally complicated anellated or bridged N'-monosubstituted N-acyl pyrazolidines in a single-stage reaction, often with excellent yields and furthermore with the use of generally readily obtainable starting materials of relatively simple structure. Thus, a number of new ring systems may be produced, and with the use of isomer-free 1,2-substituted olefins the synthesis of final products in which the carbon atoms resulting from the olefin component agree with the olefin component in its relative configuration, may be effected. Therefore, the process has a very wide scope of application, as do the compounds which may be produced thereby.

Anellated or bridged N'-monosubstituted N-acyl pyrazolidines produced in accordance with the process of the invention are useful intermediates in the synthesis of novel and pharmacologically useful organic compounds. For example, by hydrolyzing and then acylating 1-methyl-2-phenylacetyl-1,2,3,3a,4,9b-hexahydro[1]benzopyrano [4,3-c,] pyrazole, the compound 1-methyl-2-acetyl-1,2,3,3a,4,9b-hexahydro[1]benzopyrano[4,3-c]pyrazole, which possesses anticonvulsive activity, is obtained. The compounds may also be employed in the production of compounds having antiinflammatory properties.

Anellated or bridged N'-monosubstituted N-acyl pyrazolidines produced in accordance with the invention are themselves useful because of their pharmacological activity in animals. For example, cis-2-acetyl-1-methyl-1,2,3,3a,4,9b-hexahydro[1]benzopyrano[4,3-c]pyrazole, which may be produced by the process of the invention, possesses useful physical stimulation properties as for example illustrated by stimulation of motor activity in mice. This stimulation is observed at various dosages, for example at an oral dose of 30 milligrams per kilogram animal body weight. A practical oral daily dosage for the larger mammals ranges from about 30 to 100 milligrams, and unit dosage forms for administration of divided doses two to three times a day contain 10 to 50 milligrams of the compound admixed with a solid or liquid pharmaceutical carrier or diluent.

In the following non-limitative Examples (see also formula pages), all temperatures are indicated in degrees Centigrade and are uncorrected.

EXAMPLE 1

1-Methyl-2-phenylacetyl-1,2,3,3a,4,9b-hexahydro[1]benzopyrano[d4,3-c]pyrazole.

A mixture of 49 g of o-allyl-oxybenzaldehyde, 49.3 g of N-methyl-N'-phenyl-acetyl hydrazine and 1.2 liters of toluene is heated to the boil at reflux for 18 hours in an atmosphere of nitrogen, whereby the condensate is passed through 200 g molecular sieve in order to remove the water separated during the reaction. After concentrating the reaction mixture by evaporation and crystallizing the residue thrice from ether/pentane the cis isomer of the title compound, having a M.P. of 113°is obtained.

The mother liquor of the crystallization is chromatographed on 1.2 kg of silica gel with benzene/ethyl acetate (1:1), whereby fractions of 1 liter are collected. Upon concentrating fractions 3 and 4 by evaporation, trans-1-methyl-2-phenyl-acetyl-1,2,3,3a,4,9b-hexahydro[1]benzopyrano[4,3-c]pyrazole, having a M.P. of 127° (after crystallization from ether/pentane), is obtained.

After crystallizing the evaporation residue from ether/pentane, fractions 6 to 10 yield a further portion of cis-1-methyl-2-phenyl-acetyl-1,2,3,3a,4,9b-hexahydro[1]benzopyrano[4,3-c]pyrazole, having a M.P. of 113°.

EXAMPLE 2 cis-2-Acetyl-1-methyl-1,2,3,3a,4,9b-hexahydro[1]benzopyrano[d4,3-c]pyrazole.

32.4 g of o-allyl-oxybenzaldehyde are dissolved in 500 cc of toluene, the solution is heated to the boil at reflux, whereby the condensate is passed through 80 g molecular sieve, and a solution of 40 g of N-acetyl-N'-methyl hydrazine in 130 cc of toluene/dioxane (3:1) is added dropwise during the course of 40 minutes. The mixture is heated to the boil for 4 hours, is then cooled and subsequently shaken out at 0° with N hydrochloric acid. The hydrochloric acid extract is made alkaline (pH 10 –11) by the addition of solid potassium carbonate and is then extracted with methylene chloride. The organic phase is separated, dried over sodium sulphate and concentrated by evaporation, whereby the title compound is obtained as an oily residue; M.P. 116°–118° after crystallization from ether/pentane.

EXAMPLE 3

(3RS,3aRS,9bRS)-3-Chloromethyl-1-methyl-2-phenyl-acetyl-1,2,3,3a,4,9b-hexahydro[1]benzopyrano[4,3-c]pyrazole.

A mixture of 2.11 g of trans-1-chloro-4-(o-formyl-phenoxy)-2-butene, 1.64 g of N-methyl-N'-phenyl-acetyl hydrazine and 60 cc of toluene is heated to the boil at reflux for 4 hours in an atmosphere of nitrogen, whereby the condensate is passed through 40 g molecular sieve. The residue obtained after concentrating the reaction mixture by evaporation in chromatographed on 15 g of silica gel, whereby the title compound is eluted with a total of 400 cc of benzene, followed by 200 cc of benzene/ethyl acetate (9:1); M.P. 99°–101° after crystallizing thrice from ether.

The trans-1-chloro(4-o-formyl-phenoxy)-2-butene, used as starting material, may be produced as follows:

A solution of 42.7 g of salicyl-aldehyde in 150 cc of dimethyl formamide is added dropwise at 0°–10° during the course of 2 ½ hours to a suspension of 16.8 g of sodium hydride (50 percent in mineral oil) in 50 cc of dimethyl formamide. The resulting suspension of the salicyl-aldehyde sodium salt is added dropwise at a temperature of 60° during the course of 1 hour and with stirring to a solution of 87.5 g of trans-1,4-dichloro-2butene in 170 cc of dimethyl formamide. The reaction mixture is then stirred at 60° for 3 hours and is subsequently poured on 8 liters of water. Extraction is effected with ether, the ether solution is dried over sodium sulphare, is filtered, the filtrate is concentrated by evaporation and the trans-1-chloro-4(o-formyl-phenoxy)-2-butene, obtained as oily residue, is distilled in a high vacuum; B.P. 128°–130°/0.01 mm of Hg.

EXAMPLE 4 cis-5-Formyl-1-methyl-2-phenyl-acetyl-2,3,3a,4,5,9b-hexahydro-1H-pyrazolo[4,3c-]quinoline.

A mixture of 0.945 g of crude N-allyl-N-formyl-o-aminobenzaldehyde, 0.82 g of N-methyl-N′-phenyl-acetyl hydrazine and 60 cc of toluene is heated to the boil at reflux for 6 hours in an atmosphere of nitrogen, whereby the condensate is passed through 40 g molecular sieve. The reaction mixture is concentrated by evaporation, the crystalline residue is washed with ether and recrystallized from ether/methylene chloride, whereby the compound is obtained in the form of colorless crystals having a M.P. of 156°–157°.

The N-allyl-N-formyl-o-amino-benzaldehyde, used as starting material, may be produced as follows:

A mixture of 29 cc of 100 percent formic acid and 71 cc of acetic anhydride is heated to 50° for 2 hours, is then cooled to 0°, and 25 g of o-amino-benzaldehyde are added portionwise at 0° with stirring. The mixture is concentrated by evaporation at 25°/1 mm of Hg, the crystalline residue is taken up in methylene chloride and the solution is washed with a saturated aqueous sodium hydrogen carbonate solution. The methylene chloride solution is dried over sodium sulphate and concentrated by evaporation, whereby N-formyl-o-amino-benzaldehyde is obtained as residue; M.P. 75°–77° after crystallization from ether.

13.7 g of a 50 percent suspension of sodium hydride in mineral oil are washed with pentane and then suspended in 220 cc of 1,2-dimethoxy ethane. A solution of 13.7 g of N-formyl-o-amino-benzaldehyde in 100 cc of 1,2-dimethoxyethane is added dropwise to the suspension at −10° to 0° while stirring. After gas evolution is completed 16.55 g of allyl bromide are added, the mixture is stirred at 25° for 16 hours, 70 cc of pentane are added and filtration is effected. Upon concentrating the filtrate by evaporation crude N-allyl-N-formyl-o-amino-benzaldehyde is obtained as residue. M.P. 42°–44° after crystallization from ether.

EXAMPLE 5

Cis-2,3,6a,7-Tetrahydro-1H,6H,12bH-[1]-Benzopyrano[4,3-C]pyrazolo[1,2-a]-4-pyrazolone.

A mixture of 32.6 g of o-allyl-oxybenzaldehyde, 24.4 g of 3-pyrazolidone hydrochloride, 33.0 g of anhydrous sodium acetate and 750 cc of toluene is heated to the boil at reflux for 6 hours in an atmosphere of nitrogen, whereby the condensate is passed through 150 g molecular sieve in order to remove the water separated during the reaction. The reaction mixture is then shaken with aqueous sodium carbonate solution, dried over sodium sulphate and concentrated by evaporation. After crystallization from methylene chloride/ether the residue yields the title compound, having a M.P. of 119°–125°.

EXAMPLE 6

2-Acetyl-1-benzyl-1,2,3,3a,4,9b-hexahydro-[1]-benzopyrano[4,3-c]pyrazole.

A mixture of 1.63 g of o-allyl-oxybenzaldehyde, 1.64 g of N-acetyl-N′-benzyl hydrazine and 20 cc of toluene is heated to the boil at reflux for 6 hours in an atmosphere of nitrogen, whereby the condensate is passed through a water separator in order to remove the water which is separated during the reaction. The residue obtained after concentrating the reaction mixture by evaporation is chromatographed on 170 g of silica gel with benzene/ethyl acetate (9:1), whereby fractions of 250 cc are collected. After concentrating fractions 9 to 15 by evaporation, the title compound is obtained; M.P. 101°–103° after crystallization from ether/pentane.

EXAMPLE 7

1-Methyl-2-phenylacetyl-2,2a,3,4,5,5a,10b,10c-octahydro-1H-[1]benzopyrano[-cd]indazole.

A mixture of 60.6 g of o-2-cyclohexenyl-oxybenzaldehyde, 58.5 g of N-Methyl-N′-phenacetyl hydrazine and 1.5 liters of toluene is heated to the boil at reflux for 4 hours in an atmosphere of nitrogen, whereby the condensate is passed through a water separator. The reaction mixture which has been concentrated by evaporation is chromatographed on 2 kg of silica gel with benzene/ethyl acetate (3:1), whereby fractions of 2 liters are collected. Upon concentrating by evaporation fractions 4 and 5 yield a stereoisomer of the title compound, having a M.P. of 181°–183° (after crystallization from methanol/water).

After concentrating by evaporation fractions 7 to 10 yield the remaining stereoisomer of the title compound, having a M.P. of 114°–117° (after crystallization from methylene chloride/pentane).

The o-2-cyclohexenyl-oxybenzaldehyde, used as starting material, may be produced as follows:

120 g of bromo-2-cyclohexene are added dropwise at a temperature of 50° with stirring during the course of 30 minutes to a mixture of 72 g of salicyl-aldehyde sodium salt in 1 liter of dimethyl formamide. The mixture is stirred at 50° for 30 minutes and is subsequently poured on 3 liters of ether. The ether solution is washed with water, dried over sodium sulphate, filtered and concentrated by evaporation. The o-2-cyclohexenyl-oxybenzaldehyde obtained as oily residue is distilled in a high vacuum; B.P. 123°–128°/0.05 mm of Hg.

EXAMPLE 8

1-Methyl-2-phenylacetyl-(2aRS,5aSR,10bRS,10cSR)-6-formyl-1,2,2a,3,4,5,5a,6,10b,10c-decahydro-pyrazolo-[3,4,5-kl]acridine.

A mixture of 19.9 g of N-2-cyclohexenyl-N-formyl-o-amino-benzaldehyde, 18.5 g of N-methyl-N′-phenacetyl hydrazine and 600 cc of toluene is heated to the boil at reflux for 4 hours in an atmosphere of nitrogen, whereby the condensate is passed through a water separator. The reaction mixture which has been concentrated by evaporation is chromatographed on 800 g of silica gel with ethyl acetate, whereby fractions of 800 cc are collected. After concentrating by evaporation fractions 6 to 12 yield the title compound having a M.P. of 135°–137° (after crystallization from methylene chloride/pentane).

The N-2-cyclohexenyl-N-formyl-o-amino-benzaldehyde, used as starting material, may be produced as follows:

2.25 g of a 50 percent of sodium hydride in mineral oil are washed with pentane and are then suspended in 50 cc of 1,2-dimethoxy ethane. A solution of 7.45 g of N-formyl-o-amino-benzaldehyde in 100 cc of 1,2-dimethoxy ethane is then added dropwise to the suspension at −10° with stirring. After gas evolution is completed the mixture is concentrated by evaporation. The solution of the residue in 100 cc of dimethyl formamide is added dropwise at a temperature of 60° with stirring and during the course of 30 minutes to a solution of 12.1 g of bromo-2-cyclohexene in 50 cc of dimethyl formamide. The reaction mixture is then stirred at 60° for 30 minutes and is subsequently poured on 800 cc of ether. The ether solution is washed with water, dried over sodium sulphate, filtered and concentrated by evaporation. The residue is chromatographed on 250 g of silica gel with benzene/ethyl acetate (9:1), whereby fractions of 250 cc are collected. After concentrating by evaporation fractions 6 to 12 yield pure N-2-cyclohexenyl-N-formyl-o-amino-benzaldehyde as oily residue.

EXAMPLE 9 cis-1-Methyl-2-phenylacetyl-2,3,3a,4,5,9b-hexahydro-1H-pyrazolo[4,3-c]quinoline.

A mixture of 1.61 g of N-allyl-o-amino-benzaldehyde, 1.64 g of N-methyl-N'-phenacetyl hydrazine and 60 cc of toluene is heated to the boil at reflux for 4 hours in an atmosphere of nitrogen, whereby the condensate is passed through a water separator. After concentrating the reaction mixture by evaporation the title compound, having a M.P. of 129°–130° (after crystallization from ether/pentane), is obtained.

EXAMPLE 10 cis-1-(1-Methyl-4-piperidyl)-2-acetyl-1,2,3,3a,4,9b-hexahydro[1]benzopyrano[4,3-c]pyrazole.

A mixture of 3.24 g of o-allyl-oxybenzaldehyde, 3.42 g of N-acetyl-N'-(1-methyl-4-piperidyl)hydrazine and 50 cc of p-xylene is heated to the boil at reflux for 48 hours in an atmosphere of nitrogen, whereby the condensate is passed through a water separator. The reaction mixture which has been concentrated by evaporation is chromatographed on 150 g of aluminum oxide (activity II–III) with ethyl acetate/ethanol (9:1), whereby fractions of 150 cc are collected. Upon concentrating by evaporation fractions 1 and 2 yield the title compound, having a M.P. of 126°–128° (after crystallization from ether/pentane).

EXAMPLE 11

(3RS,3aSR,9bSR)-1-Methyl-2-acetyl-3-hydroxymethyl-1,2,3,3a,4,9b-hexahydro[1]benzopyrano[4,3-c]pyrazole.

A mixture of 0.96 g of cis-4-(o-formyl-phenoxy)-1-hydroxy-2-butene, 0.44 g of N-acetyl-N'-methyl hydrazine and 20 cc of toluene is heated to the boil at reflux for 4 hours in an atmosphere of nitrogen, whereby the condensate is passed through 4 g molecular sieve. Active charcoal is then added to the reaction mixture, the mixture is filtered and concentrated by evaporation. The residue is chromatographed on 15 g of silica gel with ethyl acetate, whereby fractions of 20 cc are collected. After concentrating by evaporation fractions 3 to 9 yield the title compound, having a M.P. of 128°–130° (after crystallization from ether/pentane).

The cis-4-(o-formyl-phenoxy)-1-hydroxy-2-butene, used as starting material, may be produced as follows:

A mixture of 50 g of salicyl-aldehyde sodium salt, 44 g of cis-1-chloro-4-hydroxy-2-butene and 150 cc of N,N-dimethyl formamide is stirred at 60° for 3 hours. The reaction mixture is poured on ice water and is extracted with ether. The ether extract which has been dried over sodium sulphate and concentrated by evaporation is chromatographed on 560 g of silica gel with benzene/ethyl acetate (3:1), whereby fractions of 560 cc are collected. After concentrating by evaporation 8 to 10 yield cis-4-(o-formyl-phenoxy)-1-hydroxy-2-butene as oily residue.

EXAMPLE 1

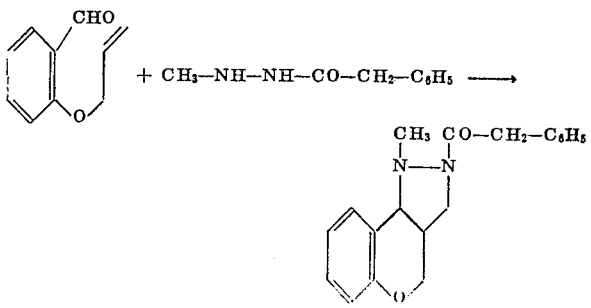

EXAMPLE 2

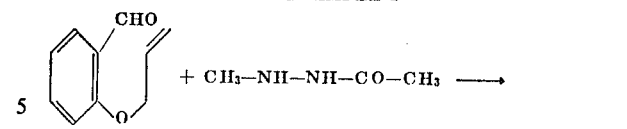

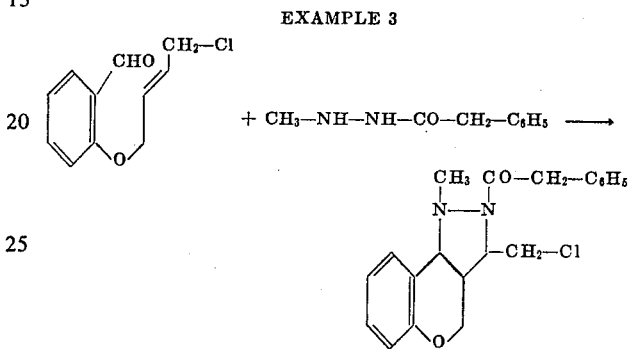

EXAMPLE 3

EXAMPLE 4

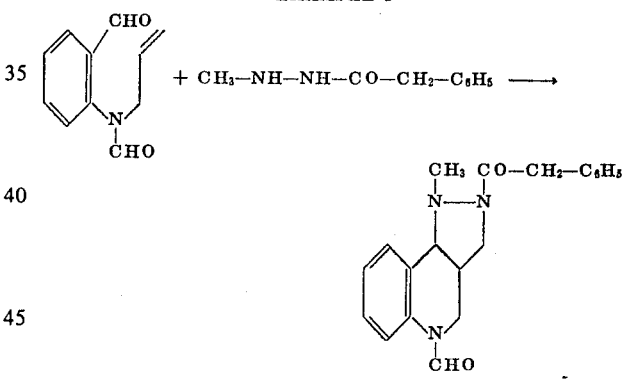

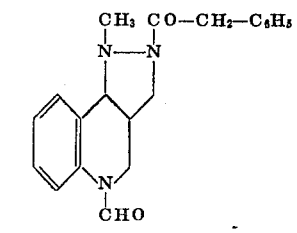

EXAMPLE 5

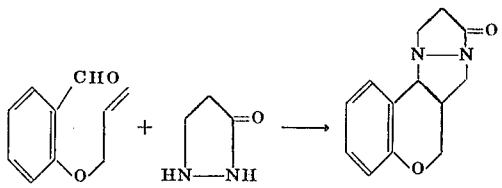

EXAMPLE 6

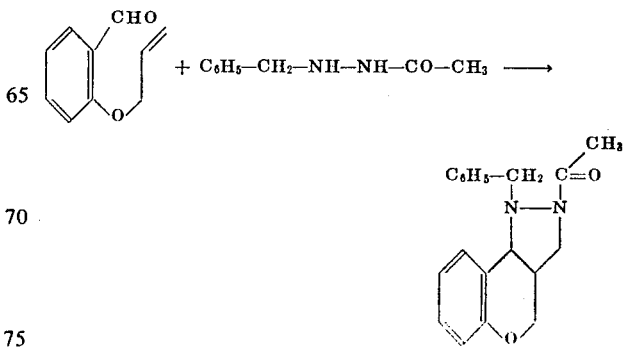

EXAMPLE 7
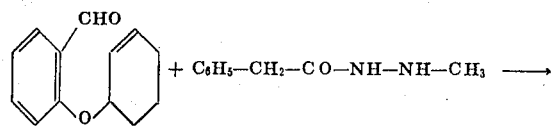
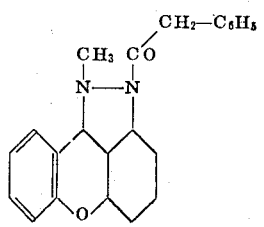
EXAMPLE 8
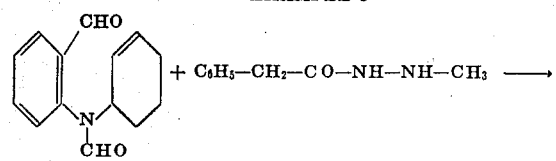
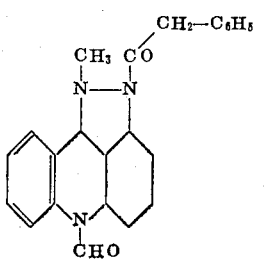
EXAMPLE 9
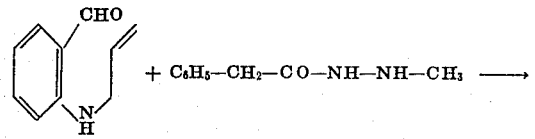
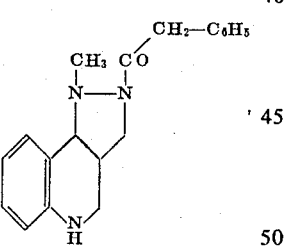
EXAMPLE 10
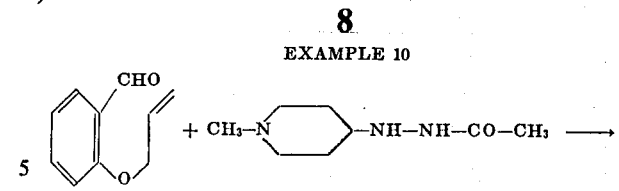
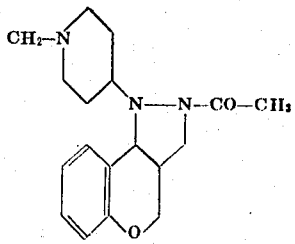
EXAMPLE 11
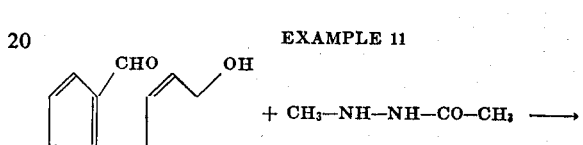
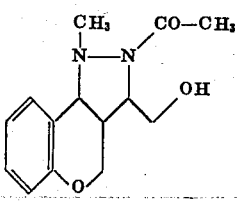
What is claimed is:
1. The compound which is cis-2-acetyl-1-methyl-1,2,3,3a,4,9b-hexahydro[1]benzopyrano[4,3-c]pyrazole.
* * * * *